United States Patent [19]

Fukatsu

[11] B 4,000,514

[45] Dec. 28, 1976

[54] AUTOMATIC REVERSE TYPE CASSETTE TAPE RECORDER

[75] Inventor: Shichiro Fukatsu, Tokyo, Japan

[73] Assignee: Akai Electric Company Limited, Tokyo, Japan

[22] Filed: Mar. 21, 1974

[21] Appl. No.: 453,432

[44] Published under the second Trial Voluntary Protest Program on March 16, 1976 as document No. B 453,432.

[30] Foreign Application Priority Data

Mar. 21, 1973  Japan ............................. 48-32427

[52] U.S. Cl. .................................. 360/60; 360/74; 360/96
[51] Int. Cl.² .................. G11B 15/04; G11B 15/52
[58] Field of Search .................. 360/60, 63, 64, 90, 360/96, 74

[56] References Cited

UNITED STATES PATENTS 2,430,538   11/1947   Somers ................................ 360/63

Primary Examiner—James W. Moffitt
Attorney, Agent, or Firm—Oblon, Fisher, Spivak, McClelland & Maier

[57] ABSTRACT

In a cassette type tape recording and reproducing apparatus in which a pair of pinch rollers are alternately brought into cooperative relation with a corresponding pair of capstans driven to rotate in opposite directions to each other by a single motor having unidirectional rotation for causing a reversal of the running direction of a tape, so that recording or reproduction is automatically effected for both sides of the cassette, recording or reproduction is automatically and continuously effected for one side or both sides of the cassette according to the mechanical selection of a mode of operation made from among the modes of recording or reproduction for only one side of the cassette, of only one time for each side of the cassette and of continuously for both sides of the cassette. Reversal of the running direction of the cassette tape is achieved by a unidirectional driving force produced by a unidirectionally rotating flywheel.

5 Claims, 10 Drawing Figures

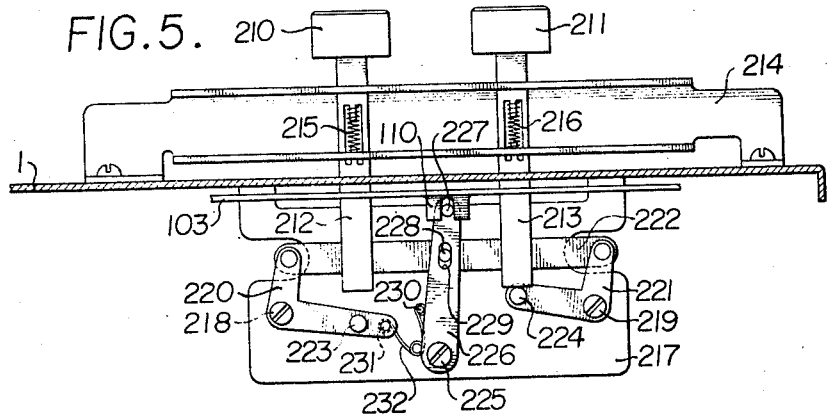
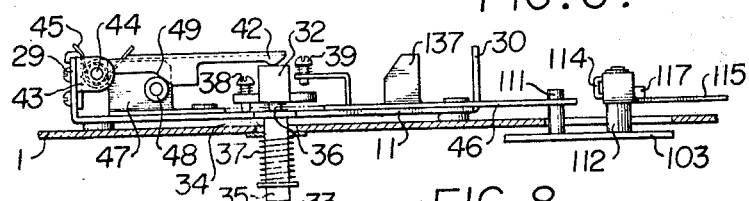
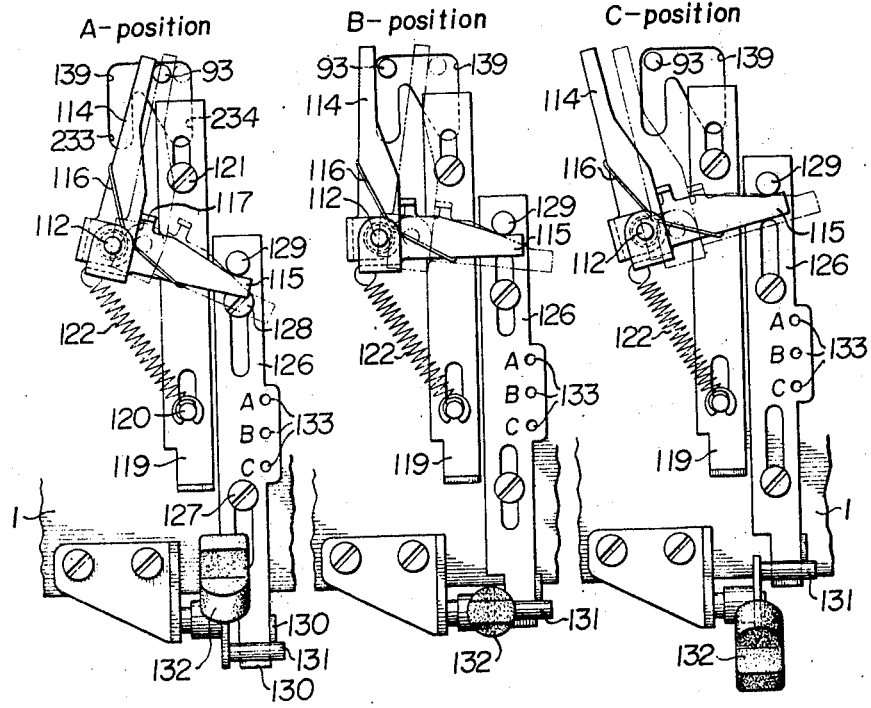

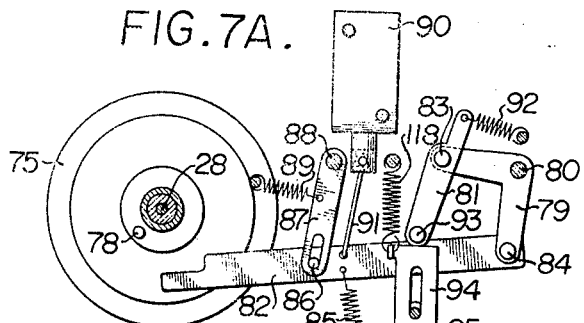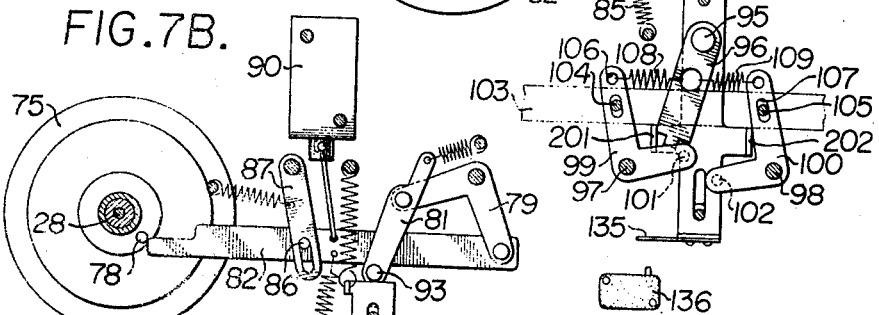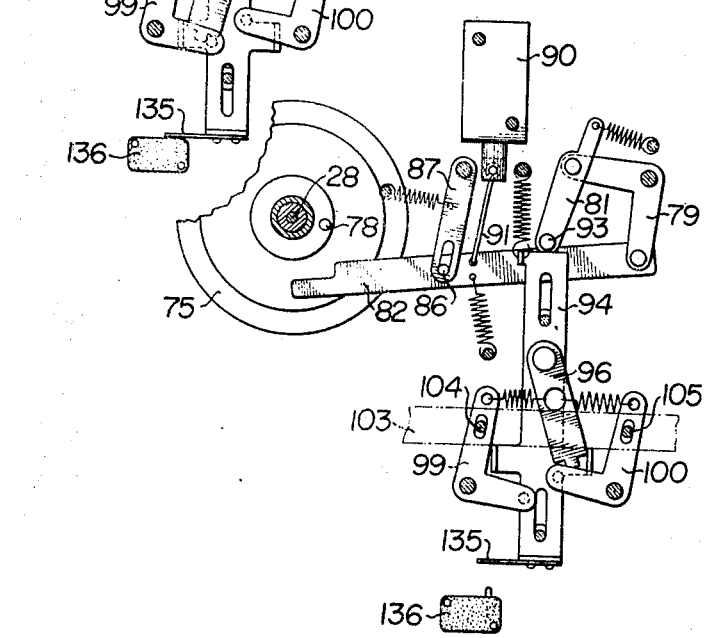

AUTOMATIC REVERSE TYPE CASSETTE TAPE RECORDER

BACKGROUND OF THE INVENTION

1. Field of the Invention:

This invention relates generally to a cassette type tape recorder featuring automatic reversal of the running direction of a magnetic tape, and more particularly to an improved cassette type tape recorder which upon completion of recording or reproducing of a magnetic tape running in one direction, automatically and selectively continues recording or reproducing of the tape in the opposite direction.

2. Description of the Prior Art:

A desirable feature of cassette type tape recorders is that recording and reproducing on the magnetic tape be effected automatically and continuously effected on the other side of the cassette after the first side has been utilized. Some of the cassette type tape recorders already available are possessed with the capability of accomplishing this function. For example, one of the heretofore known tape recorders is so designed that rotation of a driving motor is reversed at the time of completion of recording or reproduction of the magnetic tape for one side of the cassette so as to reverse the running direction of the tape, and a recording and reproduction magnetic head is incidentally shifted up or down to cooperate with recordable or reproducible tracks on the tape. Alternatively, the head may be electrically switched to change these tracks. According to another example of prior art tape recorders, a pinch roller and a capstan in two separate locations cooperate with each other alternately for tape travel in opposite directions. In still another example, the cassette itself is turned over after the finish of recording or reproduction of the tape running in one direction to continue recording or reproduction of the tape while it travels in the opposite direction.

In some of these automatic reverse type tape recorders, it is possible to select an operational mode thereof from among several modes of recording or reproduction of the tape, for example, (1) for only one side of the cassette (hereinafter referred to as Mode A), (2) only one time for each side of the cassette (hereinafter referred to as Mode B), and (3) continuously for both sides of the cassette (hereinafter referred to as Mode C). It is noted however, that such selection of an operational mode has heretofore been realized in an electrical manner.

SUMMARY OF THE INVENTION

Accordingly, it is an object of the present invention to provide an automatically reversing type cassette tape recorder in which the selection of an operational mode is mechanically realized.

It is another object of this invention to provide an automatic reverse type cassette tape recorder in which a reciprocative motion is produced by a driving source rotating in one direction for providing normal and reverse running of the magnetic tape.

It is still another object of this invention to provide an automatic reverse type cassette tape recorder which is controlled under each mode of operation depending upon the presence or absence of a break-out lug or lugs on the shoulder of the cassette.

The foregoing and other objects are achieved according to at least one aspect of the present invention through the provision of a cassette type tape recorder having a pair of capstans both of which are driven by a single motor having a unidirectional rotation to rotate in opposite directions to each other and a pair of corresponding pinch rollers, wherein one of the pinch rollers cooperates with a corresponding one of the capstans alternately for reversing the running direction of the tape, so that selective recording or reproduction of the tape is automatically effected for both sides of the cassette, and this selection of a mode of operation is realized in a mechanical manner.

Thus, according to the present invention, with the use of a reciprocatively slidable lever which is driven by a flywheel rotated in one direction to assume one of two separate positions, the running direction of the magnetic tape may be reversed, with the magnetic recording and reproduction head being incidentally shifted upward and downward. One of the two positions taken by the slidable lever is for recording or reproduction of the tape for the one side of the cassette and the other position is for recording or reproduction of the tape for the other side of the cassette.

In the cassette type tape recorder of the present invention, therefore, the operation mode is manually selected and, under each selected mode, the recording operation is controlled as desired depending upon the presence or absence of a break-out lug or lugs provided on each shoulder of the cassette. More particularly, when recording is effected under the recording mode of only one time for each side of the cassette, or Mode B, with the use of a cassette having one side being still recordable, however, the other side being already recorded, the detection means for the break-out lug is operated in association with the recording operation, whereby upon completion of recording for the recordable side of the cassette, the recording operation is ended and the tape recorder is then automatically brought into a "stop" condition. When recording is effected under the repetitive recording mode for both sides of the cassette, or Mode C, with the use of a cassette having both sides being still recordable, the operation mode selecting mechanism is forcedly returned to Mode B, whereby, upon completion of recording for both sides of the cassette, the recording operation is ended and the tape recorder is then automatically brought into the stop condition. This avoids previously recorded information from being erased so that the recorded information is protected.

BRIEF DESCRIPTION OF THE DRAWINGS

Other objects and features of the present invention will be more fully appreciated from the following detailed description of the preferred embodiment thereof when considered in conjunction with the accompanying drawing where like reference numerals designate like or corresponding parts throughout the several views, and wherein:

FIG. 5 is a sectional view of a part of the manual reversing mechanism for the tape running direction, being taken along the line V—V in FIG. 1;

FIG. 6 is a sectional view of a part of the shift mechanism for a magnetic head assembly of the tape recorder of this invention, being taken along the line VI—VI in FIG. 1;

FIG. 7 is a schematic plan view comprising FIG. 7A, FIG. 7B and FIG. 7C for use in explaining the operation of a part of the reversing mechanism in which FIG. 7A shows a normal condition of the mechanism, FIG. 7B shows a transitional condition from the normal to the reverse condition and FIG. 7C shows the reverse condition of the mechanism; and FIG. 8 is a series of schematical plan view illustrations for use in explaining the operation of the operation mode selection mechanism, in which the recording or reproduction mode for only one side of the cassette (Mode A) is shown in A-position illustration, only one time for each side of the cassette (Mode B) is shown in the B-position illustration, and continuous recording and reproduction for both sides of the cassette (Mode C) is shown in the C-position illustration.

DESCRIPTION OF A PREFERRED EMBODIMENT

Figure 1:
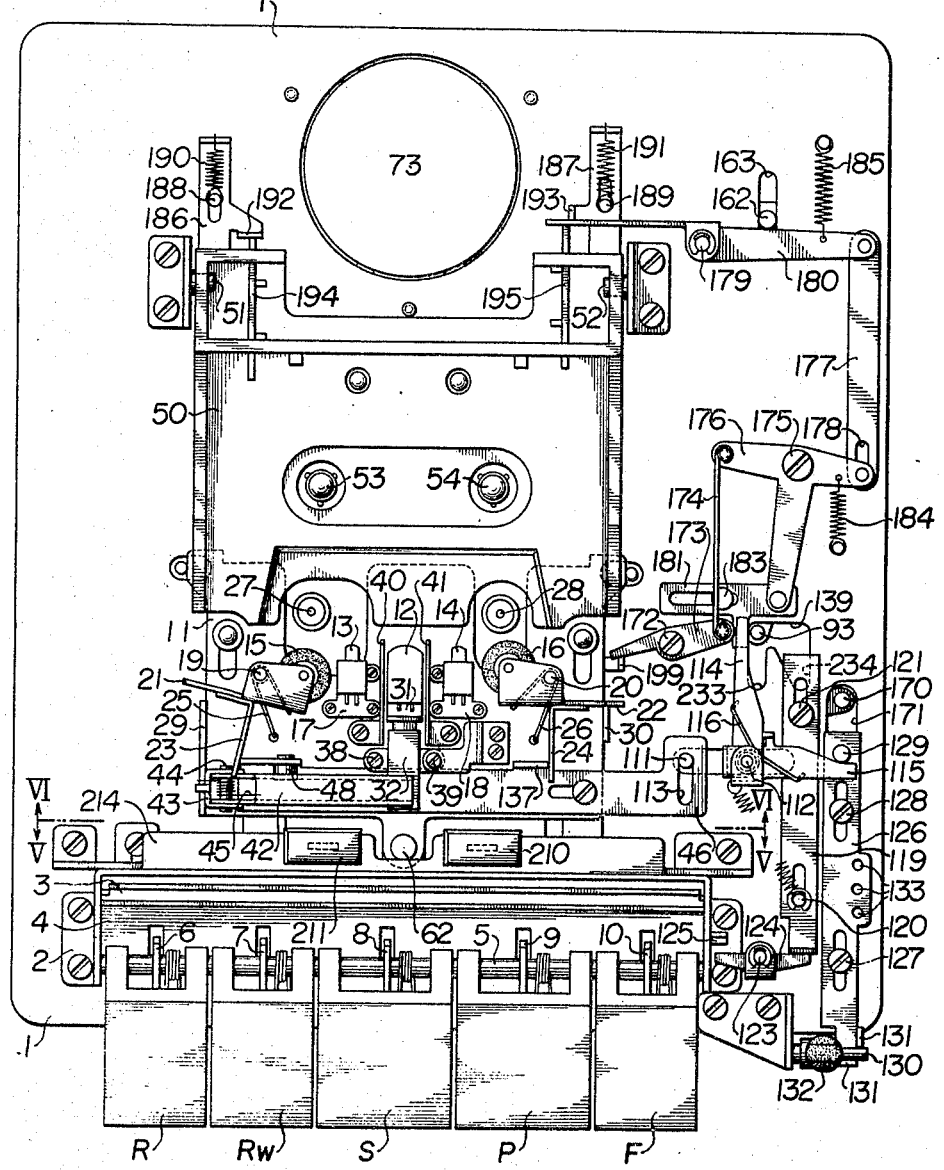
FIG. 1 is a plan view of a mechanism for reversing the direction of running of the tape employed in an automatic reverse type cassette tape recorder according to the present invention.
Figure 2:
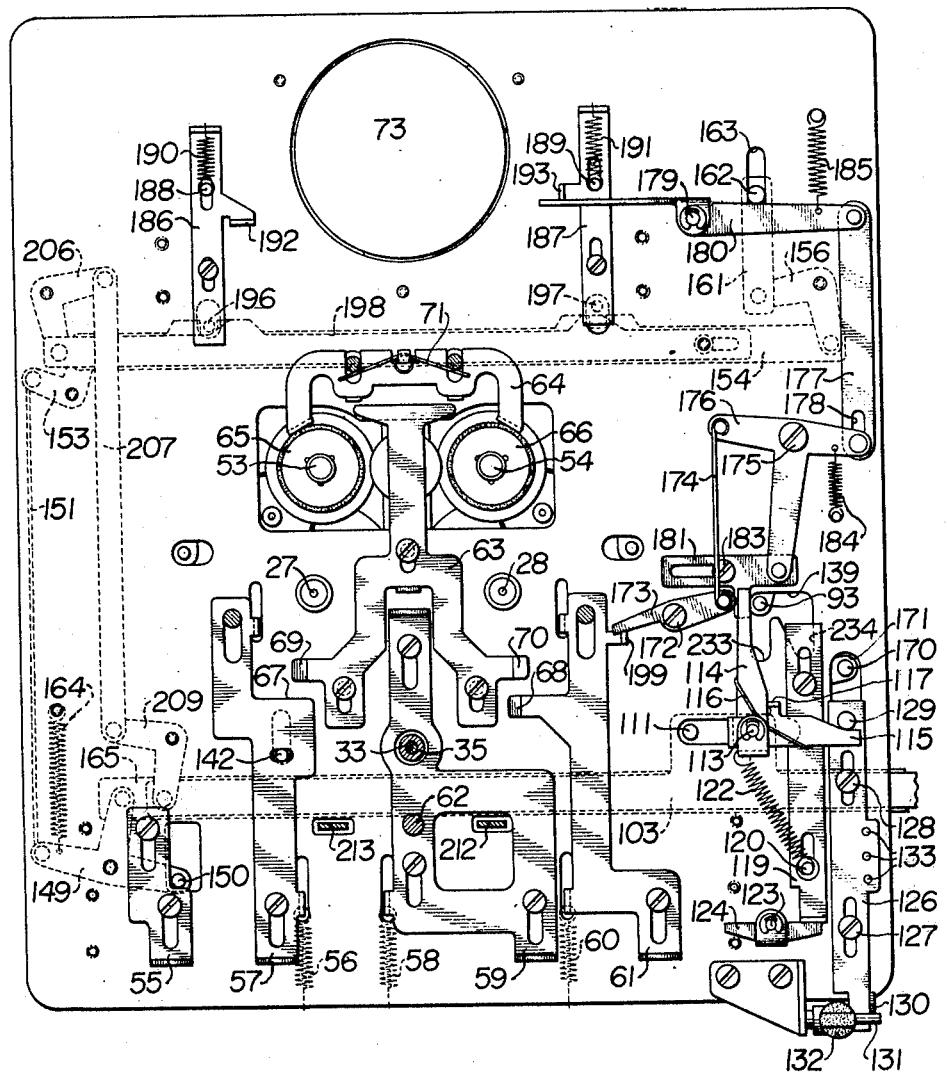
FIG. 2 is a plan view of an operation mode selection mechanism for the cassette tape recorder of the present invention.

Referring now to the drawings, wherein all the mechanisms are shown in a normal condition of the tape recorder, and more particularly to FIGS. 1 and 2, there are shown a tape running reversal mechanism and an operation mode selection mechanism employed in an automatic reverse type cassette tape recorder formed according to the present invention.

A chassis 1 of the tape recorder has a U-shaped support frame 2 fixed thereon in a known fashion on which are attached a locking plate 3 pivotably supported at both ends, a sub-plate 4 in front of the locking plate 3 at both sides thereof and a supporting rod 5 supported at both ends. On the supporting rod 5 are pivotably supported a recording push button R, a rewinding push button Rw, a stop push button S, a playback push button P and a fast winding push button F with pushing plates 6, 7, 8, 9 and 10, respectively.

A head base 11 is mounted on the chassis 1 to slide thereon and has a recording and reproducing magnetic head 12, a pair of erasing heads 13, 14 and a pair of pinch rollers 15, 16 all mounted thereon. The erasing heads 13 and 14 are fixed at a proper height on the head base 11 by means of head mounts 17 and 18, respectively. The erasing head 13 operates for normal running of the magnetic tape while the erasing head 14 operates for reverse running of the tape. The pinch rollers 15 and 16 are rotatably supported on support frames 21 and 22, respectively, which are in turn pivotably mounted on the chassis 1 by respective pins 19, 20. The support frames 21 and 22 have arms 23 and 24 extending at right angles therefrom, respectively, and are urged toward corresponding capstans 27 and 28 by wire springs 25 and 26 arranged on the pins 19 and 20, respectively. In other words, the pinch roller 15 is rotatably energized to turn in a counterclockwise direction until a part of the support frame 21 is stopped by an upstanding arm 29 of the head base 11 while the pinch roller 16 is rotatably energized to turn in a clockwise direction until a part of the support frame 22 is stopped by an upstanding arm 30 of the head base 11. These two pinch rollers 15 and 16 are alternately brought into cooperative relation with the capstans 27 and 28, respectively, in coincidence with the reversal of the running direction of the tape of the cassette.

The recording and reproducing head 12 is mounted on a head mount 31 of L-shaped form which is fixedly mounted on a head support 32. As may be seen in FIG. 6, a rod 33 extends downward from the head support 32 and is loosely guided by a sleeve 35 fixed on the lower side of the head base 11 and passing through a slot 34 of the chassis 1. A coiled spring 36 is arranged around the rod 33 between the head support 32 and the head base 11, so that the spring 36 serves to always urge the head support 32 and hence the magnetic head 12 in an upward direction. Another coiled spring 37 is arranged around the sleeve 35 between a collar bearing positioned just under the chassis 1 and a washer attached to the lower portion of the sleeve 35 in order to always attract the head base 11 downwardly or onto the chassis 1. Adjustment screws 38 and 39 are provided on either side of the head support 32 for determining the upper and lower limits of the upward and downward shifting movement of the magnetic head 12, which will be described in detail hereinbelow. Positioned adjacent the sides of the magnetic head 12 are tape guides 40 and 41 made of a spring plate and being fixed on the head base 11 so as to urge the sides of the magnetic head 12 resiliently.

On the other hand, a pivotable arm 42 is pivotably supported by a pin 44 on a U-shaped support arm 43 secured to an upstanding arm 29 of the head base 11 and is rotatably urged in a clockwise direction, as seen in FIG. 6, by a coiled spring 45 arranged around the pin 44. The tip of the arm 42 rests on the top of the head support 32 to always urge it downwardly.

An elongate lever 46 which is arranged to move reciprocatively, either manually or automatically, with the help of a plunger, extends below the pivotable arm 42 on the head base 11, and has an upstanding arm 47 on the lateral edge of the left end thereof, as clearly seen in FIGS. 1 and 6. A rotatable pin 48 provided on the lateral inside face of the upstanding arm 47 cooperates with a slant portion 49 formed on the lower surface of the pivotable arm 42 to turn it in a counterclockwise direction against the biasing force of the coiled spring 45, when the lever 46 moves rightwardly, as will be hereinafter described. The lever 46 also has an upstanding arm 137 on its central lateral edge.

A cassette support 50, which may be made of synthetic resin, is arranged in face-to-face relation with the head base 11 in such a manner that the cassette support 50 can be lifted at its front portion by spring means, not shown, with respect to short shafts 51 and 52 positioned on the chassis, thereby to discharge the cassette therein automatically. The cassette support 50 has two holes through which a pair of reel spindles 53, 54 pass upwards for rewinding the magnetic tape by engagement of the spindles with the hubs of the cassette.

Figure 3:
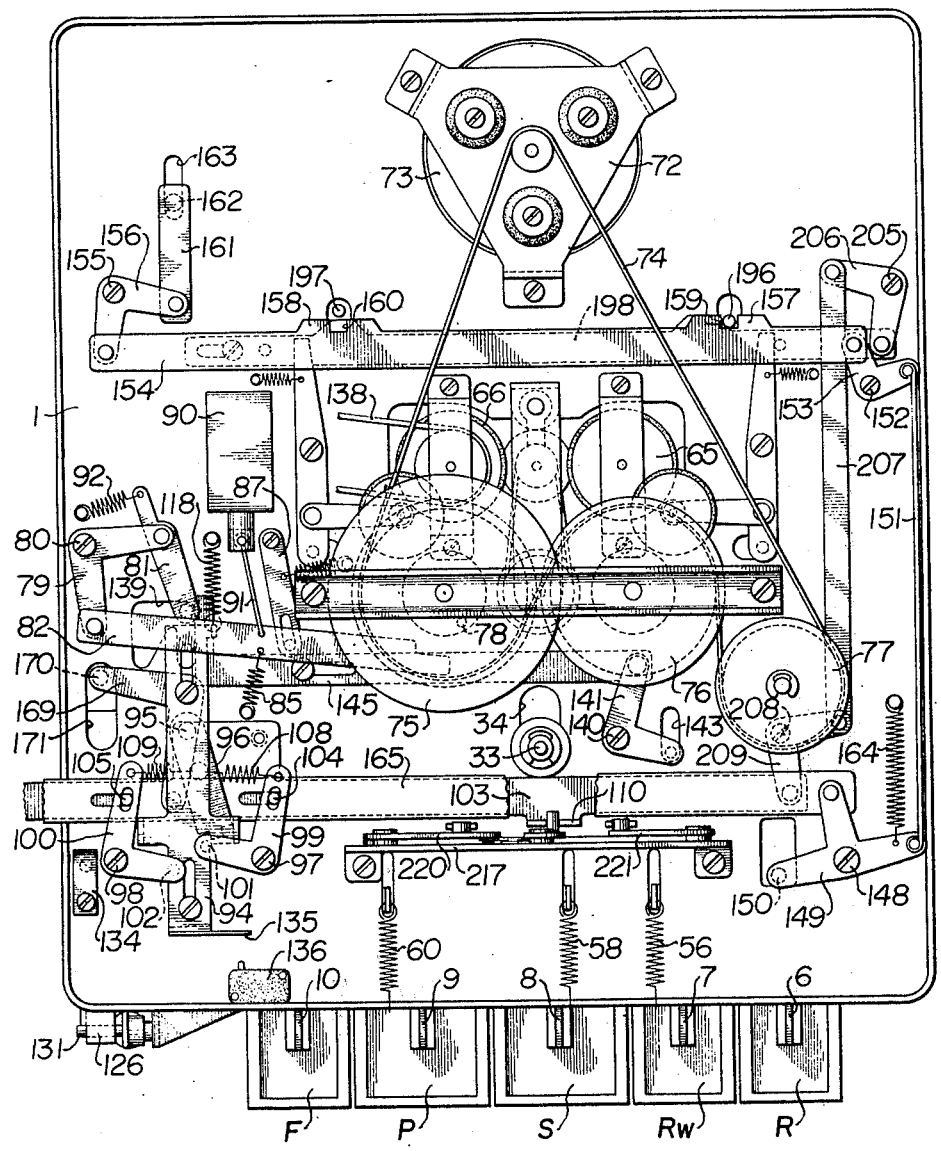
FIG. 3 is a bottom view of the reversing mechanism and the operation mode selection mechanism as shown in FIGS. 1 and 2, and of a tape driving mechanism.

Referring now to FIGS. 2 and 3, there are shown a first lever 55 adapted for sliding on the chassis 1 through the pushing plate 6 fixedly attached to the recording push button R, a second lever 57 adapted to be slid on the chassis 1 against the biasing force of spring 56 by the pushing plate 7 fixedly attached to the rewinding push button Rw, a third lever 59 adapted to be slid on the chassis 1 against the biasing force of the spring 58 by the pushing plate 9 fixedly attached to the playback push button P and a fourth lever 61 adapted to be slid on the chassis 1 against the biasing force of spring 60 by the pushing plate 10 fixedly attached to the fast forward push button F.

The third lever 59 is secured to the head base 11 so that the latter is moved together therewith. When the lever 59 is moved forwardly, or upward as viewed in FIG. 2, it will cause an inverted Y-shaped lever 63 to slide forwardly on the chassis 1 with the top of the lever 59, whereupon the lever 63 will then urge a U-shaped braking lever 64 forwardly with the tip end of the lever 63. This results in the tips of both legs of the braking lever 64 being moved away from the peripheral surfaces of rollers 65 and 66 integrally coupled with the reel spindles 53 and 54, so that braking action on the rollers 65 and 66 is removed. The braking action provided by the braking lever 64 is similarly removed by depression of the rewinding push button Rw or the fast winding push button F. This is because the second lever 57 or the fourth lever 61 is moved forwardly and in turn the shoulder 67 or the arm 68 respectively thereof forwardly pushes either the arm 69 or 70 of the inverted Y-shaped lever 63. Unless any of the first, third and fourth levers is moved forwardly, the braking lever 64 is urged at the tips of both legs thereof against the peripheral surfaces of the rollers 65 and 66 by means of a wire spring 71, so that a braking action is provided.

As is better shown in FIG. 3, an electric motor 73 is mounted on the chassis 1 by means of a bracket 72 and transmits its rotation to two flywheels 75 and 76 through a belt 74. The flywheels 75 and 76 are fixed on the chassis 1 in such a manner that they are positioned at different heights and overlap in parts, and are arranged to have opposite rotational direction to each other with the aid of a pulley 77.

The flywheel 75 is rigidly fixed to the capstan 28 and the flywheel 76 is rigidly fixed to the capstan 27 so that these capstans 27 and 28 are rotated in opposite directions.

Transmission of the rotation of the motor 73 to the reel spindles 53, 54 for driving a magnetic tape at a normal speed and at a high speed is effected in an ordinary way, and as this is not a subject matter of this invention, explanation thereof is omitted in the specification.

Rotation of the roller 66 is electrically detected by a reed switch cooperating with a magnet, not shown, revolved by a belt 138 arranged around the roller 66, however detection may be made by use of tension of a magnetic tape or a photoelectric means.

Figure 4:
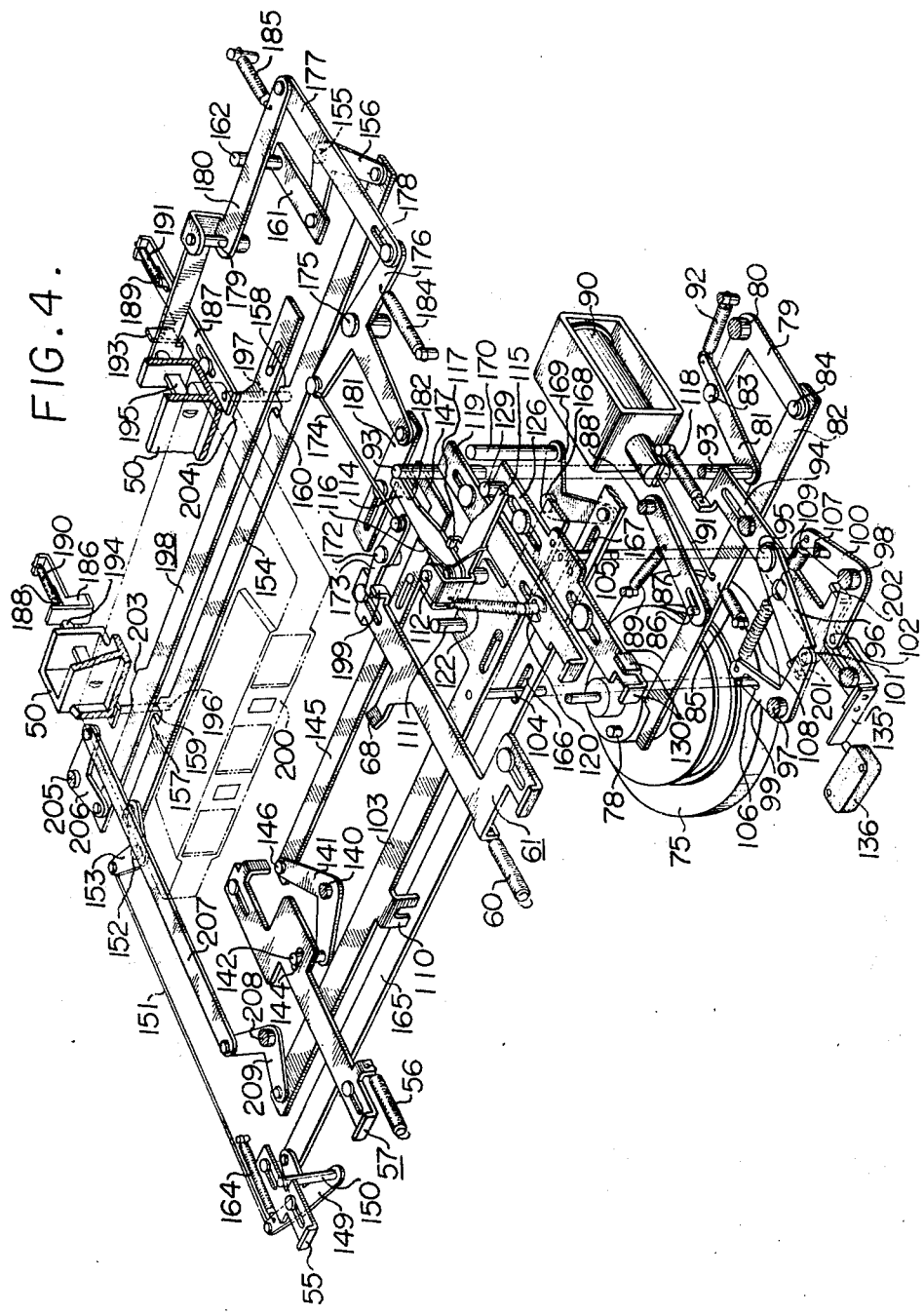
FIG. 4 is a perspective view of the reversing mechanism and the operation mode selection mechanism, both being in their normal conditions.

Referring now to FIGS. 3 and 4, the flywheel 75 has a driving pin 78 upstanding on the upper face thereof. On the chassis 1 an L-shaped lever 79 is pivotally mounted by a pin 80, and on the ends of the lever 79, levers 81 and 82 are pivotably mounted by pins 83 and 84, respectively. The lever 82 is so pulled by a coiled spring 85 with its one end secured on the chassis 1 that one end of the lever 82 is out of the circular path of the pin 78, and the movement of the lever 82 is limited by a lever 87 having a slot therein engaging with a pin 86 studded on the central portion of the lever 82. The lever 87 is pivotably mounted on the chassis 1 by a pin 88 and is pulled by a coiled spring 89 with its one end fixed on the chassis 1. An electromagnetic plunger 90 is energized at the end of winding of the magnetic tape of the cassette in a well-known manner. Upon energization of the plunger 90, a rod 91 thereof turns the lever 82 clockwise, as viewed in FIG. 4, against the biasing force of the spring 85. This causes the tip of the lever 82 to move into the circular path of the pin 78 and thus the lever 82 is forced by the pin 78 upstanding on the flywheel 75, which always rotates in a counterclockwise direction, to move against the biasing force of spring 89, so that the L-shaped lever 79 on the other end of lever 82 is turned in a counterclockwise direction, again as viewed in FIG. 4, whereby the lever 82 is moved. The lever 81, being pulled by a coiled spring 92, pushes a slider plate 94 with an upstanding pin 93 provided on one end of the lever 81. It is important to note that one end of the slider plate 94 is located just under the place of an opening 139 in the chassis 1 (see FIGS. 1 and 2) which corresponds to a first U-shaped notch 233 of the opening 139. The slider plate 94 is slidably mounted on the chassis 1 and is provided on lateral sides thereof with upstanding arms 201 and 202 and at its rear end with a coiled spring 118 being fixed at one end on the chassis 1. An arm 96 is pivotally mounted on the slider plate 94 by a pin 95. On the chassis 1, pivotably mounted by pins 97 and 98, are L-shaped levers 99 and 100, on respective one ends of which are downwardly extending pins 101 and 102 to be pushed by the arm 96. A slidable lever 103 located on the chassis 1 runs substantially at right angles with respect to the moving direction of the slider plate 94 and has a pair of pins 104 and 105 extending downwardly from the lower side thereof to engage slots 106 and 107 provided on the other ends of the L-shaped levers 99 and 100, respectively. A pair of coiled springs 108 and 109 are disposed between the other ends of the levers 99 and 100 and the slider plate 94.

The sliding lever 103 is intended to reverse the running direction of the cassette tape, and has a downward bifurcated arm 110 at the central portion thereof and two upstanding pins 111 and 112 at a widened end portion. The pin 111 engages with a slot 113 of the lever 46, as described with reference to FIG. 1, and serves in cooperation with the lever 46 to shift the magnetic head 12 upwardly or downwardly and to change over the cooperative relation between the capstan and the pinch roller, at the instant of reversal of the running direction of the magnetic tape. On the other pin 112 are pivotably mounted two levers 114 and 115 substantially at right angles with each other, each having one lateral side thereof bent up in U-shaped form at one end, and these two levers 114 and 115 are attracted to each other by a wire spring 116 disposed therebetween, however, the lever 114 is prevented from making overlying contact with the lever 115 by an upstanding arm 117 on lever 115. It is to be noted that a slant portion is formed on the lever 115. The pin 93 upstanding on one end of the lever 81 projects through the opening 139 of the chassis 1 above it in the vicinity of the lever 114. The opening 139 in addition to the first U-shaped notch 233 also has a second V-shaped notch 234.

As will be better seen from FIGS. 1, 2 and 4, a release lever 119 is guided by pins 120 and 121 secured on the chassis 1 passing through slots in lever 119 so that the lever 119 may be slidable on the chassis 1. It is also to be noted that one end of the lever 119 is located under the chassis 1 correspondingly to the second V-shaped notch 234 of the opening 139 of the chassis 1. A coiled spring 122 is arranged between the pin 120 and the U-shaped side of the lever 115 to serve to turn the levers 114 and 115 in a counterclockwise direction. The other end of the release lever 119 projects upwardly and is positioned in the vicinity of one end of a rocking lever 124 which is rockable with respect to a pin 123 on the chassis, and the other end of the rocking lever 124 is positioned in the vicinity of a projection of the locking plate 3. An operation mode selection lever 126 is juxtaposed with the lever 119 and is guided by pins 127 and 128 projecting through slots therein so that the lever 126 may be slidable on the chassis 1. The selection lever 126 has a pin 129 upstanding on the front end thereof and two upstanding arms 130 formed on the rear end thereof, between which a pin 131 of an operation mode selection knob 132 is arranged to slide the selection lever 126 forwards and backwards (refer to FIGS. 1 and 2). The selection lever 126 has a widened portion on its central part in which there are three small openings 133. On the other hand, a small opening is provided on the straight line connecting these three openings on the chassis 1 and has a small steel ball therein. The ball is retained there by a spring plate 134 from below the chassis 1. This structure permits the selection lever 126 to be placed in three different stable positions.

The slider plate 94 has a thin spring plate 135 at its one end, which will operate a micro-switch 136 when the plate 94 is pushed to its greatest extent by the pin 93.

Turning now again to FIGS. 3 and 4, a pin 142 is studded upwards on one end of an L-shaped lever 141 pivotably mounted on the back side of the chassis 1 by a pin 140, and engages with a slot 144 of the second lever 57 through a slot 143 of the chassis 1 (FIG. 3). On the other end of the L-shaped lever 141, an elongate lever 145 is pivotably mounted by a pin 146 at its one end so that the lever 145 may be slidable on the back side of the chassis 1. The other end of the lever 145 is bent at right angles to provide an arm 147 which will serve to bring the pin 93 into the second position of the opening 139 by operation of the rewinding push button Rw. The shoulder of the first lever 55, which is arranged to be moved forwardly by depression of the recording push button R, is positioned adjacent to a pin 150 studded upwards on one end of a T-shaped lever 149 which is pivotably mounted on the back side of the chassis 1 by a pin 148. A rod 151 has one end loosely coupled to the other end of the T-shaped lever 149 and the other end also loosely coupled to one end of an L-shaped lever 153 pivotably mounted on the chassis by a pin 152. On the other end of this L-shaped lever 153 is pivotably mounted one end of a connecting rod 154, the other end of which is pivotably mounted on one end of an L-shaped lever 156, which is pivotably mounted on the back side of the chassis 1 by a pin 155. Two widened portions 157 and 158 are formed separately in spaced relation on the same lateral side of the connecting rod 154 and have notches 159 and 160, respectively formed therein. On the other end of the L-shaped lever 156 is pivotably mounted one end of a lever 161, on the other end of which there is an upstanding pin 162. The pin 162 passes through a slot 163 of the chassis 1 and projects a little above the chassis. A coiled spring 164 is disposed between the chassis 1 and the other end of the T-shaped lever 149, the latter being adapted to turn in association with a recording operation, so as to turn the lever 149 in a counterclockwise direction, as viewed in FIG. 3. An elongate lever 165 is pivotably coupled at one end to the third arm of the T-shaped lever 149. The lever 165 extends on the chassis 1 just under the slidable lever 103 and has a pair of slots 166 and 167 formed therein through which a pair of downwardly projecting pins 104 and 105 pass from the lever 103. On the other end of the lever 165 is pivotably mounted an L-shaped lever 169, which is also pivotably mounted on the chassis 1 by a pin 168. The L-shaped lever 169 has an upstanding pin 170 on one end, which projects upwards through a slot 171 of the chassis 1. This pin 170 serves to return the operation mode selection lever 126 positioned at C-position of FIG. 8 by the mode selection knob 132 to the B-position and to allow recording in Mode B, even if it is desired to effect recording in Mode C.

The fourth lever 61, which is moved forwardly against the spring 60 by depression of the fast winding push button F, has a laterally extending arm 199 in the vicinity of the tip thereof which is adapted to push one end of a rocking lever 173 pivotably mounted by a pin 172 on the chassis 1. From the other end of the rocking lever 173 there extends a connecting rod 174, the opposite end of which is pivotably connected to one end of a T-shaped lever 176 which is also pivotably mounted by a pin 175 on the chassis. To the other end of the T-shaped lever 176 is coupled one end of a lever 177 through a slot 178 thereof, and on the other end of the lever 177 is pivotably mounted one end of a rocking lever 180, which is rockingly mounted by a pin 179 on the chassis 1. To the third arm of the T-shaped lever 176 is pivotably coupled a lever 181 which has a lateral arm 182 and is guided by a pin 183 to move in a straight line on the chassis 1. The arm 182 serves to move the pin 93 into the second position, or the releasing position, of the opening 139. A coiled spring 184 is attached to the other end of the T-shaped lever 176 so as to turn the lever 176 in a clockwise direction, as viewed in FIG. 2. The rocking lever 180 is subjected to a counterclockwise rotational force with respect to the pin 179 by a spring 185 having one end fixed on the chassis 1.

It is seen from FIGS. 1, 2 and 4 that a pair of sliding plates 186 and 187 are arranged at the side of the cassette support 50 opposite the head base 11 so that they may slide on the chassis 1 with the help of pins 188 and 189. Coiled springs 190 and 191 are disposed between these pins 188 and 189 and upstanding arms at the rear ends of the sliding plates 186 and 187 have inwardly extending arms 192 and 193 from the inner lateral sides thereof, the respective tips of which are upstanding. A pair of detection levers 194 and 195 for break-out lugs are loosely inserted in the rear wall of the cassette support 50 in the vicinity of both lateral ends of the wall, and front ends of the detection levers 194 and 195 abut on the shoulder of the cassette 200, when it is loaded in the position indicated by an imaginary line in FIG. 4, in order to detect the presence or absence of the break-out lugs of the cassette. The rear ends of the detection levers 194 and 195 are urged by the upstanding portions of the arms 192 and 193, respectively. Pins 196 and 197 extend downwardly from the bottom side of the sliding plates at their front ends, to engage with notches 159 and 160 provided on the connecting rod 154, respectively.

Above the connecting rod 154 adapted to be moved by depression of the recording push button R is a lever 198 which is longitudinally slidably positioned running along the connecting rod 154. The lever 198 has two widened portions 203 and 204 on the same lateral side thereof, the distance therebetween being selected to be shorter than that between the two widened portions 157 and 158 of the rod 154. One end of the lever 198 is pivotably mounted on one arm of an L-shaped lever 206 which is also pivotably mounted by a pin 205 on the chassis 1, the other arm of the L-shaped lever 206 being pivotably mounted on one end of an elongate lever 207, the other end of which is pivotably mounted on one end of another L-shaped lever 209 also pivotably mounted by a pin 208 on the chassis 1. The other end of the L-shaped lever 209 is pivotably mounted on the end of the slidable lever 103 which is reciprocated with every reversal of the running direction of the cassette tape.

Referring now to FIG. 5, there is shown a manual reversal mechanism for changing the tape running direction.

Push buttons 210 and 211, shown in FIGS. 1 and 5, are alternately depressed to invert the running direction of the magnetic tape and have downwardly extending levers 212 and 213 supported on a supporting frame 214 on the chassis 1. The levers 212 and 213 include respectively returning springs 215 and 216 disposed therein for returning the levers upwards upon removal of such depression force. A supporting plate 217 is mounted on the back side of the chassis 1 and has an L-shaped lever 220 pivotably mounted therein by a pin 218 and another L-shaped lever 221 pivotably mounted thereon by a pin 219. Respective arms of these two L-shaped levers 220 and 221 are coupled to each other by a horizontally extending lever 222 while the respective other arms of the levers 220 and 221 have pins 223 and 224 laterally projecting from the ends thereof, respectively. A rocking lever 226 is pivotably mounted at its one end by a pin 225 on the supporting plate 217 and a pin 227 studded on the other end thereof engages with the bifurcate arm 110 of the slidable lever 103. A pin 228 studded on the central portion of the lever 222 engages with a slot 229 provided on the central portion of the lever 226. A one-turn coil spring 232 is arranged between a pin 230 studded on the supporting plate 217 and a pin 231 studded on the opposite side of the L-shaped lever 220.

OPERATION

The operation of the automatic reverse type cassette tape recorder according to the present invention will now be described.

To begin with, explanation will be given with respect to reproduction of the cassette tape. When reproduction has been completely finished for one side of the cassette, cessation of rotation of the reel spindle 54 and hence of the roller 66 is detected by a well known electric means through the belt 138 coupled to the roller 66, and then the plunger 90 is energized. As will be readily understood from FIGS. 4 and 7A to 7C, energization of the plunger 90 causes the lever 82 to be attracted thereto through the rod 91, so that the tip of the lever 82 goes into the circular path of the pin 78 studded on the flywheel 75 rotating in one direction at all times, whereupon the lever 82 is pushed by the pin 78 for a short time. As a result, the L-shaped lever 79 is turned in a counterclockwise direction about the pin 80, as shown in FIG. 7B, and in turn the lever 81 is turned against the spring 92 so that the pin 93 upstanding on the end of the lever 81 pushes the slider plate 94 against the biasing force of spring 118. As the plate 94 is moved, the arm 96 provided thereon is also moved, so that the shoulder thereof pushes the pin 101 provided on the back side of the L-shaped lever 99 to turn the lever 99 in a clockwise direction. Since the pin 104 extending downwardly from the slidable lever 103 is engaged with the slot 106 of the L-shaped lever 99 and the pin 105 is engaged with the slot 107 of another L-shaped lever 100, a clockwise turning of the L-shaped lever 99 about pin 97 will cause the slidable lever 103 to move rightwards, as viewed in FIG. 4 and FIG. 7, and simultaneously another L-shaped lever 100 to turn clockwise with respect to its pivot pin 98.

When the slider plate 94 is moved by the pin 93 to its farthest reach, the microswitch 136 is actuated by the spring plate 135 so that excitation of the plunger 90 is cut off. This results in the slider plate 94 being returned to its initial position by the spring 118, when the arm 96 is turned rightwards in FIG. 7C by the tensile force of the spring 109 until the arm 96 abuts the upstanding arm 202 of the slider plate 94. As mentioned above, while the flywheel 75 is always rotating in one direction, the reversal mechanism for the tape running direction is actuated merely during the period of excitation of the plunger 90, so that the slidable lever 103 is moved in a given direction, that is, it is shifted from a first position so far taken thereby to a second position.

Turning now to FIG. 1, rightward shifting of the slidable lever 103 causes the lever 46 to move rightwards by means of the pin 111 studded on the lever 103 and engaging with the slot 113 of the lever 46, and thus the pinch roller 15 is brought into cooperative relation with the capstan 27 by the wire spring 25 while the pinch roller 16 is moved away from the capstan 28, because the arm 24 attached to the support frame 22 is urged by upstanding arm 237 of the lever 46. At the same time, as seen from FIG. 6, the pin 48 provided on the upstanding arm 47 forces up the slant portion 49 of the arm 42 and accordingly, the tip of the arm 42 is lifted up. As a result, the head support 32 is raised by the coiled spring 36 until it abuts the stop pin 39. In this manner, the magnetic head 12 is put ready for reproduction of the tape for the opposite side of the cassette.

Upon completion of reproduction of the opposite side of the cassette to a full extent and energization of the plunger 90, the reversal mechanism is again operated in a like manner as previously described so that the slidable lever 103 is shifted leftwards to take up its initial position. Coincidentally, the pinch roller 15 is separated from the capstan 27 while the pinch roller 16 is brought into contact with the capstan 28, and the magnetic head 23 is shifted down by the arm 42.

Automatic reverse operation of the tape recorder has been described above with respect to reproduction of the cassette tape, however, the operation will now be described in connection with the operation mode selection mechanism by reference to FIG. 8.

FIG. 8 illustrates three positions, that is, A-position, B-position and C-position, taken by the selection mechanism, wherein the A-position is for recording or reproduction mode for only one side of the cassette (Mode A), the B-position is for recording or a reproduction mode of only one time for each side of the cassette (Mode B), and the C-position is for recording or a reproduction continuously for both sides of the cassette (Mode C).

1. Mode A:

In the automatic reversal operation referred to above, the operation mode selection knob 132 is manually put into the A-position where the operation mode selection lever 126 is positioned in its retreated position and thus the pin 129 standing on the front end thereof moves the lever 115 while turning the lever 114 in a clockwise direction by means of the tensioned wire spring 116 engaged therebetween. As a result, the lateral edge of the lever 114 brings the pin 93 standing on the lever 81 into the second position of the opening 139 of the chassis 1 corresponding to the second V-shaped notch 234 thereof. With the pin 93 located in the second position, when the reproduction has finished for one side of the cassette and thereby the plunger 90 has been energized, the pin 93 pushes the release lever 119 which in turn pushes the projection 125 of the locking plate 3 through the rocking lever 124. Thus, the locking plate 3, is released from its operative position for reproduction of the tape, and the playback push button P is returned to its inoperative position, and at the same time the head base 11 is also returned to its stop position. In this way, the tape recorder is brought into a stop condition after the finish of reproduction of the tape for only one side of the cassette as desired.

2. Mode B:

The selection knob 132 is manually put into B-position where the selection lever 126 takes the middle position as illustrated at the B position in FIG. 8. Therefore, the pin 93 is not pushed by the lever 114 and stays at or takes the first position of the opening 139 corresponding to the first U-shaped notch 233 thereof. With the pin 93 located in the first position, when reproduction has finished for one side of the cassette and the plunger 90 has been energized, the pin 93 pushes only the slider plate 94, but does not push the release lever 119. This results in the running direction of the cassette tape being reversed as hereinbefore described and reproduction being automatically continued for the other side of the cassette, however, the playback push button P is not returned to its inoperative position.

Upon reversal of the running direction of the cassette tape, the slidable lever 103 is shifted rightwards as viewed in FIG. 4, to take the second position, the levers 114 and 115 taking the positions indicated in an imaginary line at the B-position in FIG. 8, thereby bringing the pin 93 with the lateral edge of the lever 114 into the second position of the opening 139 of the chassis 1. Accordingly, when reproduction has finished for the opposite side of the cassette and the plunger 90 is again energized, the pin 93 is actuated to enter the second V-shaped notch 234 and to push the release lever 119, so that the locking plate 3 is released and the playback push button P is returned to its inoperative position. Thus, the tape recorder is brought into a stop condition following the finish of reproduction of the tape for each side of the cassette as desired.

3. Mode C:

The selection knob 132 is manually put into the C-position where the selection lever 126 takes the advanced position as illustrated at the C-position in FIG. 8. The lever 114 is moved away from the pin 93 under the action of the coiled spring 122, and when reproduction has finished for one side of the cassette and the plunger 90 is energized, the pin 93 pushes only the slider plate 94 and reproduction is automatically continued for the other side of the cassette. Upon reversal of the running direction of the cassette tape, the lever takes the position indicated in an imaginary line at the C-position in FIG. 8 and the pin 93 stays in the first positon of the opening 139. When reproduction has finished for the other side of the cassette and the plunger 90 is energized again, the pin 93 is brought into the first U-shaped notch 233 and the slidable lever 103 is shifted leftwards to the first position again. However, since the release lever 119 has never been actuated by the pin 93, the running direction of the cassette tape is automatically reversed again in the normal direction, so that reproduction is repeated for the one side of the cassette. In this way, reproduction of the tape is externally repeated for both sides of the cassette as desired.

Operation of the automatic reverse recording will now be described.

Assuming that the tape recorder is in a recording mode for one side of a cassette, the slidable lever 103 takes the first extremely leftward position, as shown in FIG. 4, and therefore the lever 198 is in the extremely rightward position. Under this condition, the widened portion 204 of the lever 198 pushes the pin 197 extending downwards from the sliding plate 187 against the biasing force of spring 191 so that the pin 197 is disengaged from the notch 160 of the connecting rod 154 while another widened portion 203 does not align with the pin 196 extending downwards from the sliding plate 186, whereby the pin 196 is allowed to engage with notch 159 therein.

It is well-known that a cassette is provided with a pair of break-out lugs on either shoulder thereof which are effective to detect whether the cassette is still recordable or not. If it is assumed that a cassette 200 with its break-out lug taken off on the left shoulder thereof is loaded, as shown in FIG. 4, the detection lever 194 will be ablve to go into the cassette at the left shoulder under the influence of the coiled spring 190, so that the pin 196 will engage with the notch 159 of the connecting rod 154. To the contrary, if a cassette with its break-out lug still existing on the left shoulder thereof is loaded, the pin 196 will not engage with the notch 159 of the lever 154. In this case, the lever 154 can slide in association with recording operation.

When it is desired that recording should be effected on the tape of the cassette which is recordable on both sides, the recording push button R and the playback push button P are depressed together. Similarly, to the operation of reproduction as above referred to, when recording has finished for one side of the cassette and the plunger 90 is energized so that the slidable lever 103 is shifted from the first to the second positions, the pinch roller 16 moves away from the capstan 28 while the pinch roller 15 makes contact with the capstan 27 for reversing the running direction of the cassette tape, and the magnetic head 12 is shifted upward. In this way, recording is automatically continued for the other side of the cassette. It will be understood that operation of the selection knob 132 at the A- B- and C-positions is the same as the explanation given with respect to the reproduction operation in FIG. 8.

Automatic reverse recording operation for a cassette according to the present invention is different from an automatic reproduction operation as mentioned in the following two aspects The first aspect is directed to recording in Mode A with a cassette with one side still recordable and the other side already recorded.

In case such a cassette is loaded in a normal recording position and the selection knob 132 is positioned in the A-position of FIG. 8, or in Mode A, depression of the recording push button R allows the lever 161 to move its pin 162 away from the rocking lever 180 and thus causes the lever 180 to be turned counterclockwise by the spring 185 with respect to the pin 179. As a result, the lever 181 is moved rightwards, as viewed in FIG. 4, so that the arm 182 brings the pin 93 into the second position of the opening 139 corresponding to the second V-shaped notch 234 thereof. Upon completion of recording for one side of the cassette and energization of the plunger 90, the pin 93 is forced into the notch 234, thereby urging the release lever 119. Thus, the locking plate 3 is released and the tape recorder is brought into a stop condition. There is no problem in this operational mode.

In case the same cassette is used for recording and the selection knob 132 is positioned in the B-position of FIG. 8, or in Mode B, depression of the recording push button R allows the detection lever 195 to go into the cassette at the right shoulder and thus the lever 181 to move rightwards, so that the pin 93 is brought into the second position of the opening 139, just as described above with respect to Mode A. This means that, though the tape recorder is set in Mode B, upon completion of recording for one side of the cassette, the pin 93 urges the release lever 119 and thus the tape recorder is brought into its stop condition. This is advantageous in that, when the tape recorder is set in error to effect recording in Mode B for a cassette with one side being still recordable and the other side being already recorded, the tape recorder is brought into a stop condition upon completion of recording for the recordable one side of the cassette, thereby avoiding erasure of information already recorded on the other side of the cassette.

The second aspect of the present invention is directed to recording in Mode C with a cassette with both sides still recordable.

According to the present invention, the selection knob 132 is positioned in the C-position of FIG. 8 in order to effect recording in Mode C. As shown in FIG. 4, however, when the recording push button R is depressed, the lever 165 is moved leftwards with the result that the pin 170 urges the selection lever 126 back to the B-position and thus the overall mode selection mechanism is forced to take the same position as the B-position. This means that the tape recorder is brought into its stop condition upon completion of recording of one time for each side of the cassette, even if the tape recorder has initially been set in Mode C. This is advantageous in that the information, such as music once recorded on both sides of the cassette can never be erased in error. It is very useful to have such an operation feature in only the recording mode as opposed to the reproduction mode.

When the rewinding push button Rw is depressed, the elongate lever 145 is moved rightwards, so that the end arm 147 thereof will urge the pin 93 into the second position of the opening 139 of the chassis 1. On the other hand, when the fast winding push button F is depressed, the T-shaped lever 176 is turned through the fourth lever 61, the rocking lever 173 and the connecting rod 174, so that the pin 93 will be urged by the arm 182 of the lever 181 into the second position of the opening 139 of the chassis 1. In both cases, when the cassette tape has been completely wound on one of the reels contained in the cassette and the reel spindle 53 is stopped, the plunger 90 is energized and the pin 93 urges the release lever 119, so that the push button Rw or F is released from its operative position and the tape recorder is brought into its stop condition.

Automatic reverse recording or playback has been described above and manual reverse recording or playback may be possible according to the present invention. Such manual operation will now be described with reference to FIG. 5.

FIG. 5 shows the condition of the tape recorder where recording or reproduction is effected in a normal running direction of the cassette tape. Under such condition, when the push button 211 is depressed, the lower end of the lever 213 pushes down the pin 224 studded on one end of the L-shaped lever 221 to turn it in a counterclockwise direction about the pin 219, so that the lever 222 is moved leftwards in FIG. 5. As a result, the pin 228 studded on the lever 222 shifts the slidable lever 103 leftwards by means of the pin 227 studded on the upper end of the rocking lever 226 so as to take the second position. This corresponds to rightward movement of the slidable lever 103 in FIG. 4, and causes the pinch roller 15 to cooperate with the capstan 27, the pinch roller 16 to move away from the capstan 28 and the magnetic head 12 to be shifted upwardly. Another L-shaped lever 220 is simultaneously turned in a counterclockwise direction about the pin 218, so that the coil spring 232 is turned clockwise beyond its dead center to take another stable position.

When the tape recorder is in a recording or a reproduction condition in a reverse running direction of the cassette tape, if the push button 210 is depressed, the slidable lever 103 will take the first position similarly, so that the running direction of the tape is reversed and the magnetic head 12 is shifted downward. This enables recording or reproduction in a normal direction of the tape.

It is to be understood that there is no difference of operation of the reversal mechanism between automatic reversal and manual reversal of the running direction of the cassette tape and a driving source for shifting the slidable lever 103 is the only difference therebetween.

It is also to be understood that the embodiment described herein is illustrative only and is not intended as limiting the invention to the construction and arrangement of parts, as it is well understood that the invention may be applied to any cassette type tape recorder differing from the illustrated embodiment, such as, for example, a cassette type tape recorder having a rotary magnetic head instead of the shiftable magnetic head shown herein may be utilized. Accordingly, it is to be understood that within the scope of the appended claims, the invention may be practiced otherwise than as specifically described herein.

What is claimed as new and desired to be secured by Letters Patent of the United States is:

1. A cassette type tape recorder enabling automatic and continuous recording or reproduction of the tape from one end of the tape to the other end thereof and from said other end thereof back to said one end thereof, comprising:
   a chassis;
   an electric motor mounted on said chassis for rotation in one direction;
   a pair of capstans each being provided with a flywheel and arranged to be rotated by said motor respectively in opposite directions;
   a pair of pressure rollers adapted to cooperate with said pair of capstans for transportation of the tape;
   an actuating means arranged to alternately assume a first position where one of said pair of capstans cooperate with one of said pair of pressure rollers and a second position where the other of said capstans cooperates with the other of said pressure rollers;
   means for detecting the tape end;

an operating means for operating said actuating means which includes a pin operable in a first position to operate said operating means and in a second position to bring the tape recorder into a stop condition;
first means for moving said pin into one of said first and said second positions thereof; and
second means movable movable to a first position when said pin is positioned in its second position by said first means, to a second position when said pin is positioned in its first position by said first means and to a third position when said pin is positioned outside its first and second positions, respectively for recording or reproducing on only one side of the cassette, for recording or reproducing one time only on each side of the cassette, and for recording or reproducing continuously for both sides of the cassette.

2. A cassette type tape recorder as set forth in claim 1 further comprising:
a first detection means for detecting the presence of one of the break-out lugs normally provided on the cassette when said actuating means is in its first position;
a second detection means for detecting the presence of the other of said break-out lugs when said actuating means as in its second position; and
means for bringing said pin into its second position in association with a recording operation of the tape recorder when said second detection means finds no break-out lug on the cassette.

3. A cassette type tape recorder as set forth in claim 1 in which said operating means consists of:
an electromagnetic plunger energized for a given period in response to said tape end detection means;
a means for transmitting a driving force from one of the flywheels to said pin during energization of said plunger;
a slider plate adapted to slide linearly against a spring action substantially perpendicular to the direction of movement of said actuating means by means of said pin positioned in its first position;
a lever pivotably mounted at its one end on said slider plate;
a pair of L-shaped levers pivotably mounted on said chassis in close proximity to said slider plate and provided with a motion receiving portion for receiving a turning motion of said pivotable lever;
a pair of coiled springs arranged between said pivotable lever and one of the arms of each of said L-shaped levers; and
a coupling means for coupling said one of said arms of said L-shaped levers to said actuating means.

4. A cassette type tape recorder as set forth in claim 1 further comprising means for forcedly returning said second means from its third position to its second position in association with a recording operation of the tape recorder.

5. A cassette type tape recorder as set forth in claim 1 further comprising an additional means for manually operating said actuating means.

* * * * *